United States Patent
Muramatsu et al.

(10) Patent No.: US 10,619,542 B1
(45) Date of Patent: Apr. 14, 2020

(54) EXHAUST DEVICE

(71) Applicant: SUZUKI MOTOR CORPORATION, Hamamatsu-shi, Shizuoka (JP)

(72) Inventors: Takayoshi Muramatsu, Hamamatsu (JP); Tetsuji Takeda, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 16/559,297

(22) Filed: Sep. 3, 2019

(30) Foreign Application Priority Data

Oct. 17, 2018 (JP) ................... 2018-195720

(51) Int. Cl.
*F01N 3/28* (2006.01)
*F01N 11/00* (2006.01)
(52) U.S. Cl.
CPC .............. *F01N 3/28* (2013.01); *F01N 11/007* (2013.01)

(58) Field of Classification Search
None
See application file for complete search history.

(56) References Cited

U.S. PATENT DOCUMENTS 4,049,388 A * 9/1977 Scheitlin ................... F01N 3/28
422/171

FOREIGN PATENT DOCUMENTS

JP 2016-113927 A 6/2016

* cited by examiner

*Primary Examiner* — Walter D. Griffin
*Assistant Examiner* — Jelitza M Perez
(74) *Attorney, Agent, or Firm* — Stein IP, LLC

(57) ABSTRACT

There is provided an exhaust device. An exhaust pipe is connected to an engine for a vehicle. A chamber is connected to a downstream side of the exhaust pipe. At least two catalysts arranged in a vehicle front-rear direction in the chamber. A connection pipe connects the two catalysts with each other. The connection pipe is provided with punching holes.

8 Claims, 5 Drawing Sheets

EXHAUST DEVICE

CROSS-REFERENCE TO RELATED APPLICATIONS

The disclosure of Japanese Patent Application No. 2018-195720 filed on Oct. 17, 2018, including specification, drawings and claims is incorporated herein by reference in its entirety.

TECHNICAL FIELD

The present disclosure relates to an exhaust device.

BACKGROUND

In order to meet recent exhausted gas regulations, improvement of purification performance of a catalyst is required. For example, in Patent Document 1, a plurality of catalysts is arranged in an exhaust chamber constituting a muffler. In addition, it is also considered to ensure the desired purification performance by increasing the size of the catalyst and the like.
Patent Document 1: Japanese Patent Application Publication No. 2016-113927 A When the catalysts are arranged in the exhaust chamber as in Patent Document 1, exhausted gas after passing through the catalysts is all released to space in the chamber, and an output valley is easily formed at a specific engine rotation speed (for example, in a low-mid rotation speed range). In consideration of a flow of the exhausted gas, it is also considered to reduce the chamber volume such that the exhausted gas is easily directed toward the muffler, but it is assumed that muffling performance is reduced.

SUMMARY

It is at least one of objects of the present disclosure to provide an exhaust device capable of improving the muffling performance and avoiding the output valley. According to an aspect of the embodiments of the present disclosure, there is provided an exhaust device including an exhaust pipe connected to an engine for a vehicle, a chamber connected to a downstream side of the exhaust pipe, at least two catalysts arranged in a vehicle front-rear direction in the chamber, and a connection pipe connecting the two catalysts with each other, in which the connection pipe is provided with punching holes.

With the above configuration, the muffling performance can be improved and the output valley can be avoided.

BRIEF DESCRIPTION OF THE DRAWINGS

In the accompanying drawings.

DETAILED DESCRIPTION OF THE EMBODIMENTS

Hereinafter, an embodiment of the present disclosure will be described in detail with reference to the accompanying drawings. In addition, an example in which the present disclosure is applied to a sports-type motorcycle will be described, but the application object can be changed without being limited thereto. For example, the present disclosure may be applied to other types of vehicles, for example, straddle-type vehicles such as buggy-type three-wheeled vehicles and four-wheeled vehicles. A vehicle front side is indicated by an arrow FR, a vehicle rear side is indicated by an arrow RE, a vehicle left side is indicated by an arrow L, and a vehicle right side is indicated by an arrow R in the direction. In the following drawings, some configurations are omitted for convenience of explanation.

Figure 1:
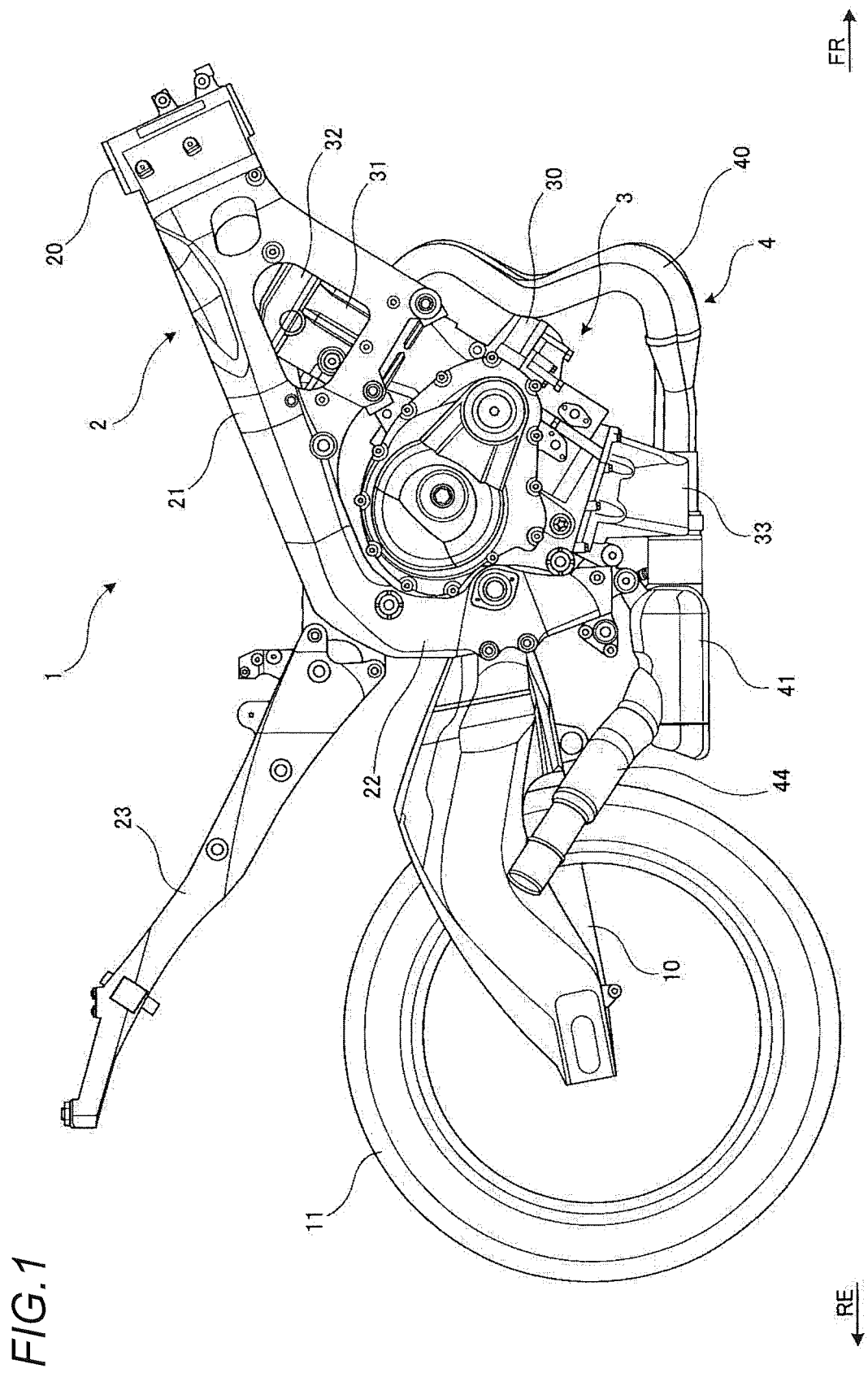
FIG. 1 is a right side view of a vehicle according to the embodiment.

A schematic configuration of a vehicle according to the embodiment will be described with reference to FIG. 1. FIG. 1 is a right side view around an exhaust device according to the embodiment.

As shown in FIG. 1, a vehicle 1 is a sports-type motorcycle, and is configured by suspending (supporting) an engine 3 on a vehicle body frame 2 made of steel or aluminum alloy. The engine 3 is, for example, a parallel four-cylinder engine. The engine 3 is formed by attaching a cylinder head 31 and a cylinder head cover 32 to an upper portion of an engine case 30 in which a crankshaft (not shown) or the like is accommodated. An oil pan 33 is provided in a lower portion of the engine case 30.

The vehicle body frame 2 is a twin-spar-type frame formed by aluminum casting, and is formed to obtain rigidity as a whole vehicle body by suspending the engine 3 as described above. The vehicle body frame 2 as a whole body extends from a front side to a rear side, and has a shape curved downward on a rear end side.

Specifically, the vehicle body frame 2 includes a main frame 21 extending rearward from a head pipe 20 in a left-right bifurcated manner and a body frame 22 extending downward from a rear end of the main frame 21. A fuel tank (not shown) is arranged at an upper portion of the main frame 21. A swing arm 10 is swingably supported at a substantially central portion of the body frame 22 in an upper-lower direction. The swing arm 10 extends rearward. A rear wheel 11 is rotatably supported at a rear end of the swing arm 10.

A seat rail 23 extending rearward and upward is provided at an upper end of the body frame 22. A rider seat and a pillion seat (both not shown) are provided on the seat rail 23.

A pair of left and right front forks is steerably supported by the head pipe 20 via a steering shaft (not shown). A front wheel (not shown) is rotatably supported at lower portions of the front forks.

Exhaust pipes 40 are connected to exhaust ports of the cylinder head 31 as a part of an exhaust device 4. A plurality of (four in the embodiment) exhaust pipes 40 extend downward from the exhaust ports and are bent rearward on a front lower side of the engine 3, and then combined into one and extend to the vehicle rear side.

A chamber 41 as a muffler is connected to a rear end (the downstream side) of the exhaust pipes 40. Catalysts 42 and 43 (see FIGS. 3 and 4) described below are arranged in the chamber 41. A muffler joint pipe 44 extending rearward and upward is connected to a downstream end of the chamber 41, and a muffler (not shown) is connected to a rear end of the muffler joint pipe 44. Exhausted gas from the engine 3 is purified by the catalysts 42 and 43 in the chamber 41 through the exhaust pipes 40, and then discharged to an outside through the muffler joint pipe 44 and the muffler. The exhaust device 4 will be described below in detail.

Figure 2:
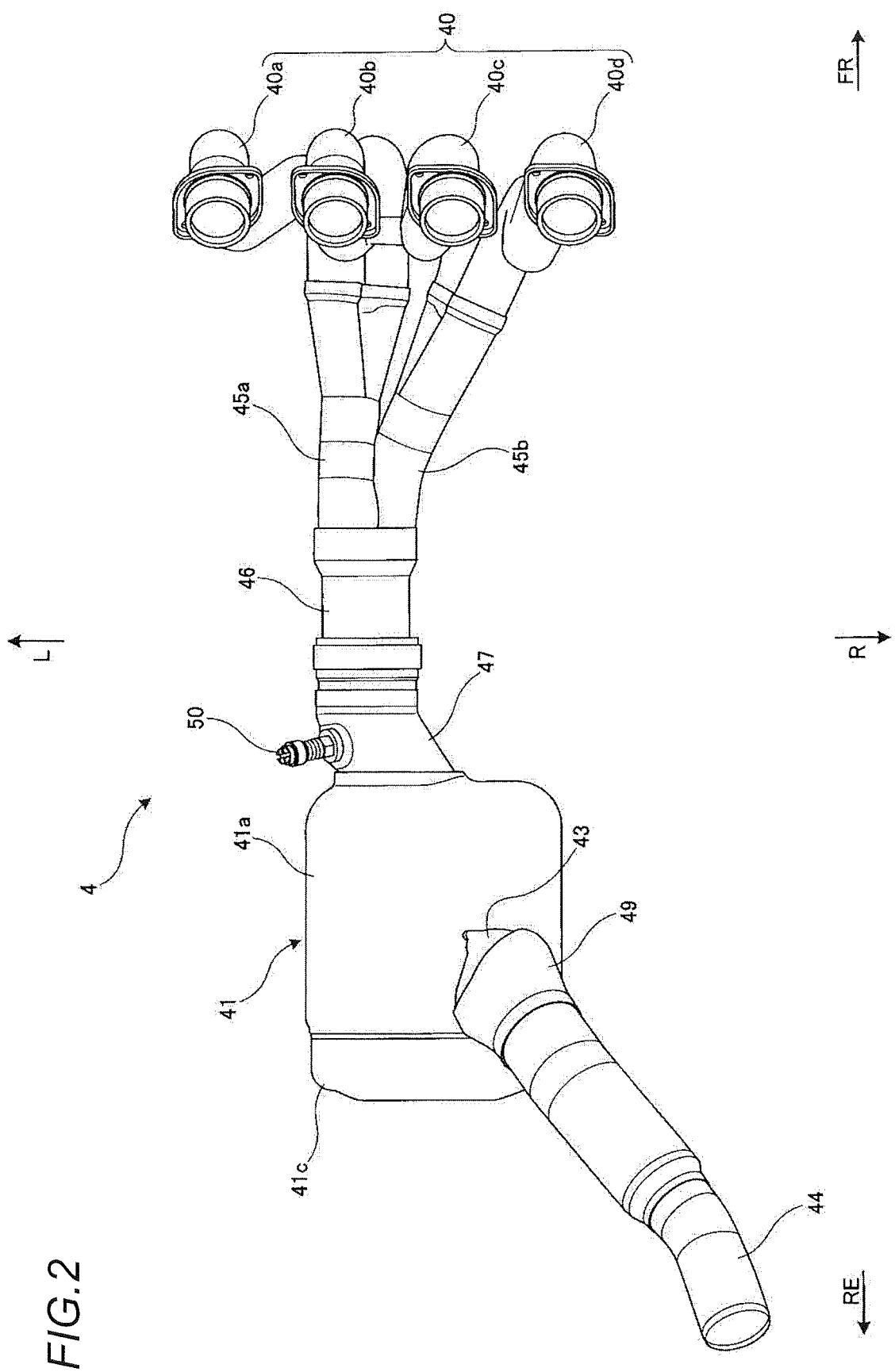
FIG. 2 is a top view of an exhaust device according to the embodiment.
Figure 3:
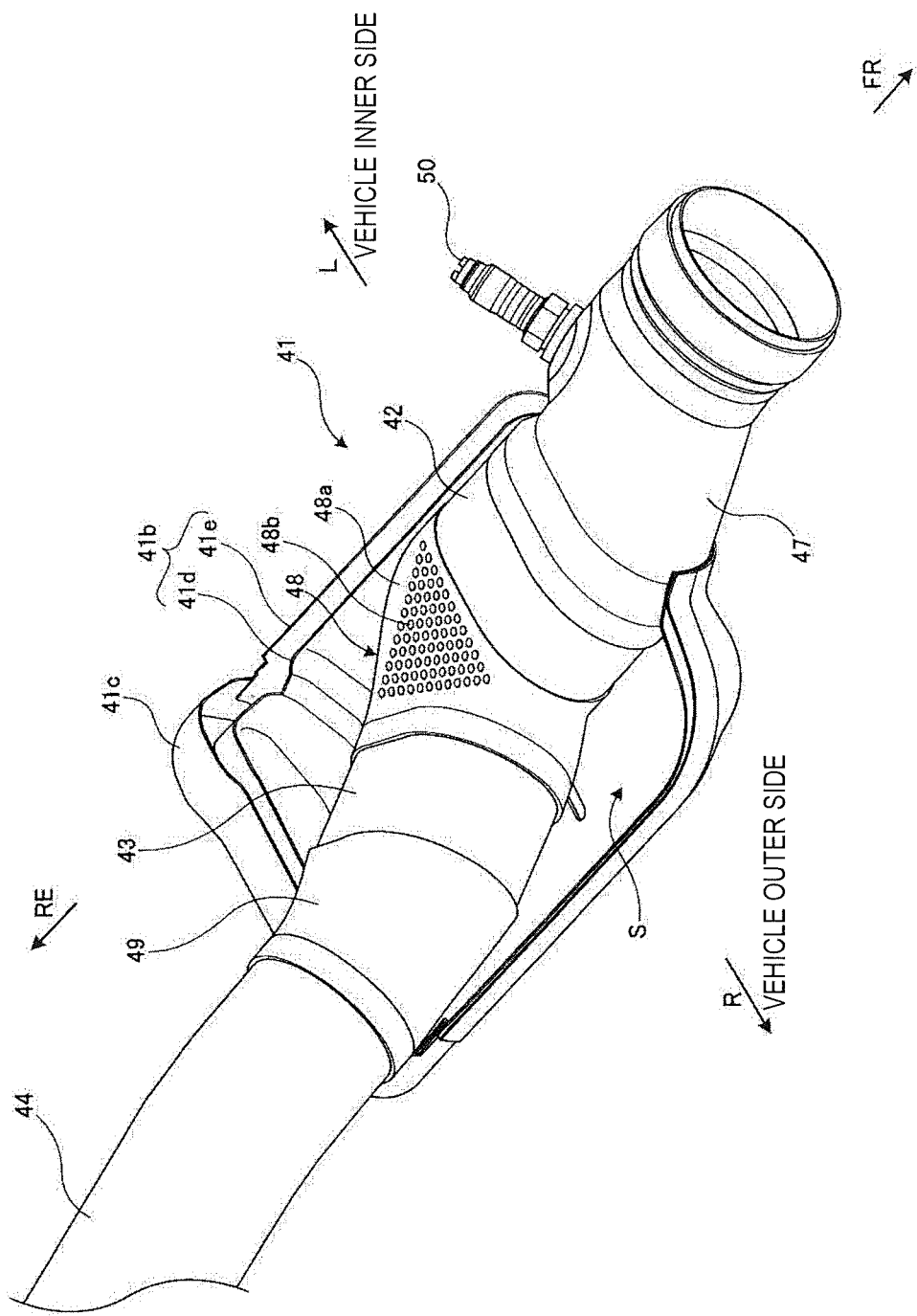
FIG. 3 is a perspective view showing an internal structure of a chamber according to the embodiment.
Figure 4:
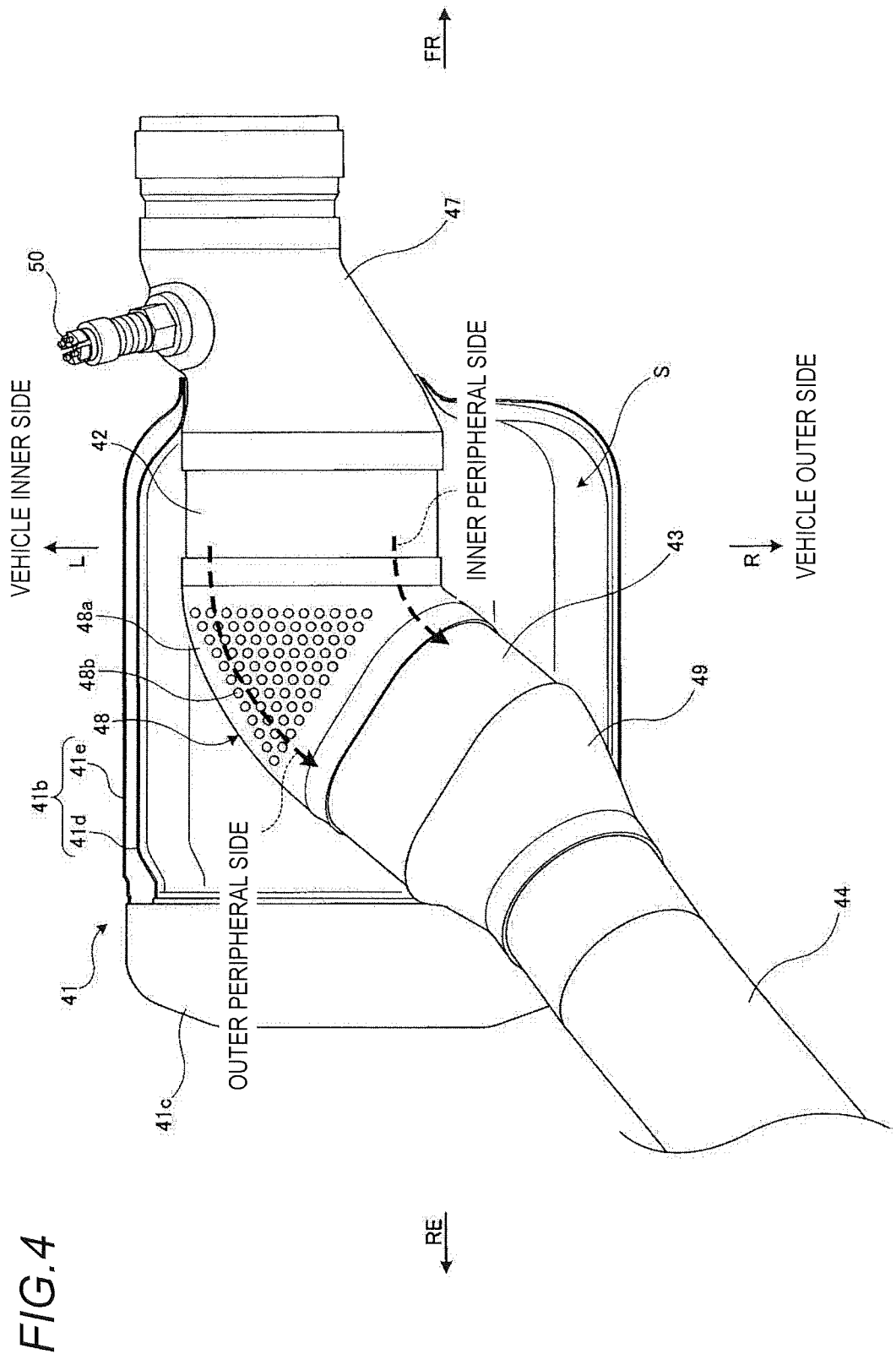
FIG. 4 is a top view showing the internal structure of the chamber according to the embodiment.

Next, the exhaust device according to the embodiment will be described with reference to FIGS. 2 to 4. FIG. 2 is a top view of the exhaust device according to the embodiment. FIG. 3 is a perspective view showing a structure around the chamber according to the embodiment. FIG. 4 is a top view showing the structure around the chamber according to the embodiment.

As shown in FIGS. 2 to 4, the exhaust device 4 includes exhaust pipes 40 connected to the engine 3 for the vehicle (see FIG. 1), the chamber 41 connected to the downstream side of the exhaust pipes 40, the two catalysts 42 and 43 arranged in the chamber 41, the muffler joint pipe 44 connected to the downstream side of the chamber 41, the muffler (not shown) and the like.

As shown in FIG. 2, the exhaust pipes 40 extend downward from the exhaust ports (not shown) of the cylinder head 31 (see FIG. 1). For convenience, the exhaust pipes 40 are referred to as exhaust pipes 40a, 40b, 40c and 40d from a left side in a vehicle width direction.

The four exhaust pipes 40a to 40d are bent rearward on the front lower side of the engine case 30. The two left exhaust pipes 40a and 40b are connected to a first collection pipe 45a to be combined into one, and the two right exhaust pipes 40c and 40d are connected to a first collection pipe 45b to be combined into one. The first collection pipes 45a and 45b respectively extend rearward and are connected to a second collection pipe 46 to be combined into one. The second collection pipe 46 has a circular cross section. The chamber 41 is connected to a rear end of the second collection pipe 46 via a first tapered pipe 47 (that may be referred to as a connector pipe).

The first tapered pipe 47 connects the second collection pipe 46 and the chamber 41. The first tapered pipe 47 is expanded in diameter in a left-right direction and reduced in diameter in the upper-lower direction from upstream toward downstream such that an axial cross section changes from a circular shape to an elliptical shape elongated in the left-right direction. The first tapered pipe 47 is formed in a tubular shape by welding a pair of divided bodies separated in the direction of a short axis. A downstream end of the first tapered pipe 47 penetrates a front end of the chamber 41, and is then connected to the elliptical catalyst 42 in the chamber 41.

The chamber 41 has a rectangular parallelepiped shape having a rectangular shape in a top view, and is formed in a box shape having a dimension smaller in the upper-lower (height) direction than that in the front-rear and left-right directions. Specifically, the chamber 41 includes an upper half portion 41a and a lower half portion 41b that are upper and lower split, and a tail portion 41c as a lid member that closes a rear end. The chamber 41 has a double box structure, and includes an inner portion 41d and an outer portion 41e, as shown in FIGS. 3 and 4. In FIGS. 3 and 4, for convenience of explanation, the upper half portion 41a is omitted, and only the double box structure of the lower half portion 41b is shown. An open space S of the exhausted gas is formed in the chamber 41 by these configurations.

The two catalysts 42 and 43 are arranged in the chamber 41. Each of the catalysts 42 and 43 has an elliptical shape cross section orthogonal to an axial direction that is long in the left-right direction or the front-rear direction, and accommodates a honeycomb portion in an outer cylinder portion. The catalysts 42 and 43 are, for example, three-way catalysts, and adsorb pollutants (carbon monoxide, hydrocarbon, nitrogen oxides and the like) in the exhausted gas to convert the pollutants into harmless substances (carbon dioxide, water, nitrogen and the like) and perform purification. The two catalysts 42 and 43 have substantially the same shape and are arranged side by side in a vehicle front-rear direction in the chamber 41.

Specifically, the catalyst 42 is arranged at a front side of the chamber 41 and biased to a left side that is a vehicle inner side. An axial center of one catalyst 42 located at the front side in the chamber 41 is oriented in the vehicle front-rear direction. The axial, center of the catalyst 42 is arranged at the vehicle inner side (the left side) with respect to a width center of the chamber 41 in the left-right direction.

The catalyst 43 is arranged rearward than the catalyst 42 and biased to a right side that is a vehicle outer side in the chamber 41. At least a part of the catalyst 43 is arranged at the vehicle outer side (the right side) with respect to the width center of the chamber 41 in the left-right direction. The other catalyst 43 located at a rear side of the chamber 41 is arranged obliquely such that a downstream end thereof is oriented to the vehicle outer side. More specifically, an axial center of the catalyst 43 is inclined toward an upper right rear side.

A downstream end of the catalyst 42 and an upstream end of the catalyst 43 are connected by a connection pipe 48. The connection pipe 48 is formed so as to bend an exhaust flow path between the catalysts 42 and 43 from the front-rear direction rearward and upward on the vehicle outer side. That is, the connection pipe 48 is bent from one catalyst 42 toward the other catalyst 43. More specifically, the connection pipe 48 is formed in a substantially fan shape (a shape slightly similar to a triangle) having a curvature radius on the vehicle outer side larger than that on the vehicle inner side. In addition, an axial cross section of the connection pipe 48 has an elliptical shape elongated in a horizontal direction similarly to that of the catalysts 42 and 43.

The connection pipe 48 is formed in a tubular shape by joining an upper half portion and a lower half portion (not shown for convenience) by welding or the like. In this way, since the connection pipe 48 has an upper and lower split structure, the connection pipe 48 can be formed in a fan shape having an abrupt bend R. In addition, by forming the connection pipe 48 with an abrupt bend R, the two catalysts 42 and 43 can be arranged frontward and rearward than the connection pipe 48 in close proximity. Specifically, a facing distance between the downstream end of the one catalyst 42 and the upstream end of the other catalyst 43 is smaller on an inner peripheral side (a smaller side of the bend R) than on an outer peripheral side (a larger side of the bend R) of the connection pipe 48. That is, the downstream end of the catalyst 42 and the upstream end of the catalyst 43 are arranged closer to each other on the inner peripheral side than on the outer peripheral side of the connection pipe 48.

As described above, the connection pipe 48 has an horizontally long elliptical shape in the cross section orthogonal to the axial direction, and is formed in a tubular shape by welding a pair of divided bodies (the upper half portion and the lower half portion) separated in a direction of the short axis. That is, the connection pipe 48 has an upper surface portion 48a and a lower surface portion (not shown) corresponding to a long axis of the elliptical shape. In FIGS. 3 and 4, only the upper surface portion 48a is illustrated for convenience of description. The upper surface portion 48a and the lower surface portion each have a substantially flat outer surface shape with a sufficiently large curvature radius. That is, the upper surface portion 48a and the lower surface portion each have a substantially planar shape that is gently curved so as to be slightly convex in the upper-lower direction.

The upper surface portion 48a and the lower surface portion are provided with a plurality of punching holes 48b penetrating in a thickness direction (a lower surface portion side is not shown). The plurality of punching holes 48b are arranged so as to form a triangular lattice at equal intervals corresponding to a plan view shape of the upper surface portion 48a. In addition, the plurality of punching holes 48b is arranged in a concentrated manner at a center of the chamber 41 in a plan view. The lower surface portion is similar. The shape, size, arrangement number, arrangement interval and the like of the punching holes 48b can be appropriately changed in accordance with required output and muffling performance.

A muffler joint pipe 44 is connected to the downstream end of the catalyst 43 via a second tapered pipe 49. The second tapered pipe 49 connects the catalyst 43 and the muffler joint pipe 44. The second tapered pipe 49 is expanded in diameter in a short axis of an elliptical shape and is reduced in diameter in a long axis of the elliptical shape from the upstream toward the downstream such that an axial cross section changes from the elliptical shape to a circular shape. The second tapered pipe 49 is formed in a tubular shape by welding a pair of divided bodies separated in the direction of the short axis. A part of a downstream end side of the catalyst 43 and the second tapered pipe 49 project rearward and upward from the upper half portion 41a of the chamber 41. The muffler joint pipe 44 is connected to a downstream end of the second tapered pipe 49. The muffler joint pipe 44 extends rearward and upward toward the rear wheel 11. The muffler (not shown) is connected to a downstream end of the muffler joint pipe 44. The muffler is arranged so as to overlap the rear wheel 11 in a side view.

The first tapered pipe 47 is provided with an exhausted gas sensor 50 that detects exhausted gas components in the exhaust flow path on an upstream side of the catalyst 42. The exhausted gas sensor 50 is, for example, a zirconia-type oxygen sensor, and has a cylindrical shape of a predetermined length. One end side of the exhausted gas sensor 50 constitutes a detection unit, and a tip end thereof is attached so as to penetrate an inside of the first tapered pipe 47. A wiring (not shown) is connected to the other end side of the exhausted gas sensor 50. In an axial direction of the exhausted gas sensor 50, the other end side (a wiring side) is directed toward the vehicle inner side in the left-right direction.

An output (a current value) of the exhausted gas sensor 50 changes according to oxygen concentration in the exhausted gas, and the current value is output to an electronic control unit (ECU) (not shown) via the wiring. The exhausted gas sensor 50 is not limited to the oxygen sensor, and may be, for example, an air-fuel ratio sensor. In the exhaust device 4 configured as described above, the exhausted gas generated from the engine 3 flows into the chamber 41 through the exhaust pipe 40. When the exhausted gas flows into the chamber 41, the exhausted gas strikes the tip end of the exhausted gas sensor 50, so that the oxygen concentration in the exhausted gas before purification can be detected. In the chamber 41, the exhausted gas first flows into the catalyst 42 on an upstream side and is purified. The purified exhausted gas flows into the catalyst 43 through the connection pipe 48 and is further purified. A part of the exhausted gas flowing through the connection pipe 48 is diffused into the open space S in the chamber 41 through the plurality of punching holes 48b. The exhausted gas further purified by the catalyst 43 is muffled by the muffler through the muffler joint pipe 44, and is discharged to the outside.

By the way, in order to meet the recent exhausted gas regulations, improvement of purification performance of the catalyst is required, so that the catalyst is enlarged or a plurality of catalysts are provided. In view of appearance and layout of the vehicle, it is desired to arrange the catalyst in the chamber. However, in general, when the catalyst is arranged in the chamber, the exhausted gas after passing through the catalyst is all released to space in the chamber, and an output valley is easily formed at a predetermined engine rotation speed (particularly in a low-mid rotation speed range). In this case, if the chamber volume is reduced to facilitate a flow of the exhausted gas toward the muffler, the muffling performance is decreased. In addition, since the chamber volume is limited in the first place, it is difficult to arrange a plurality of catalysts in the chamber.

Therefore, positional relationship and connection configuration of a plurality of catalysts arranged in the chamber are considered. Specifically, in the embodiment, the two catalysts 42 and 43 are arranged side by side in the vehicle front-rear direction in the chamber 41, and the two catalysts 42 and 43 are connected by the connection pipe 48. Further, the plurality of punching holes 48b is formed in the connection pipe 48.

According to these configurations, the exhausted gas is diffused into the chamber 41 through the plurality of punching holes 48b. That is, the exhausted gas can be gradually diffused (released) into the chamber 41 through the punching holes 48b without being directly released into the chamber 41. In this way, while a part of the exhausted gas is released from the punching holes 48b to improve a muffling effect, the other part of the exhausted gas can smoothly flow to the downstream side through the connection pipe 48. Therefore, an output fluctuation (a decrease) in a specific engine rotation speed range can be prevented. That is, the improvement of the muffling performance and the avoidance of the output valley can be both achieved.

The axial center of the catalyst 42 is oriented in the vehicle front-rear direction, while the downstream end of the catalyst 43 is arranged so as to be oriented to the outside of the vehicle, and the connection pipe 48 is bent from the catalyst 42 toward the catalyst 43. The axial center of the catalyst 42 is arranged at the vehicle inner side with respect to the width center of the chamber 41, and at least a part of the catalyst 43 is arranged at the vehicle outer side with respect to the width center of the chamber 41. According to these configurations, a front-rear length can be suppressed when the two catalysts 42 and 43 are arranged in the chamber 41, and layout of the chamber 41 in the vehicle can be improved. Since the flow of the exhausted gas is not inhibited while bending the exhaust flow path, the arrangement gas can smoothly flow to the downstream side, and the output decrease in the specific engine rotation speed range can be prevented.

Since the downstream end of the catalyst 42 and the upstream end of the catalyst 43 are arranged adjacent to each other, the exhaust flow path between the catalysts 42 and 43 can be shortened. As a result, not only the catalyst 42 on an exhaust upstream side but also the catalyst 43 on an exhaust downstream side can be temperature activated at an early stage.

Since the catalysts 42 and 43 each have an elliptical shape cross section orthogonal to the axial direction that is short in the thickness direction of the chamber 41, a height dimension of the chamber 41 can be suppressed while increasing the size of the catalysts 42 and 43 in a plan view.

The connection pipe 48 includes the upper surface portion 48a and the lower surface portion corresponding to longitudinal directions of the catalysts 42 and 43, and the plurality of punching holes 48b are formed only on the upper surface portion 48a and/or the lower surface portion. That is, no punching hole is formed in side surfaces of the connection pipe 48. Since welding points of the upper half portion and the lower half portion are located on the side surfaces of the connection pipe 48, the exhausted gas can be prevented from leaking more than necessary from the welding points by not providing the punching holes in the side surfaces. As a result, the output valley can be prevented. In particular, the outer peripheral side of the connection pipe 48 is more effective because the exhausted gas easily flows faster on the outer peripheral side than on the inner peripheral side. Even if no punching hole is provided on the side surfaces of the connection pipe 48, sufficient area can be ensured for forming the punching holes 48b in the substantially flat upper surface portion 48a and the lower surface portion. Therefore, the number of the punching holes 48b can be increased in the upper surface portion 48a and the lower surface portion, and the muffling performance of the chamber 41 can be ensured.

Figure 5:
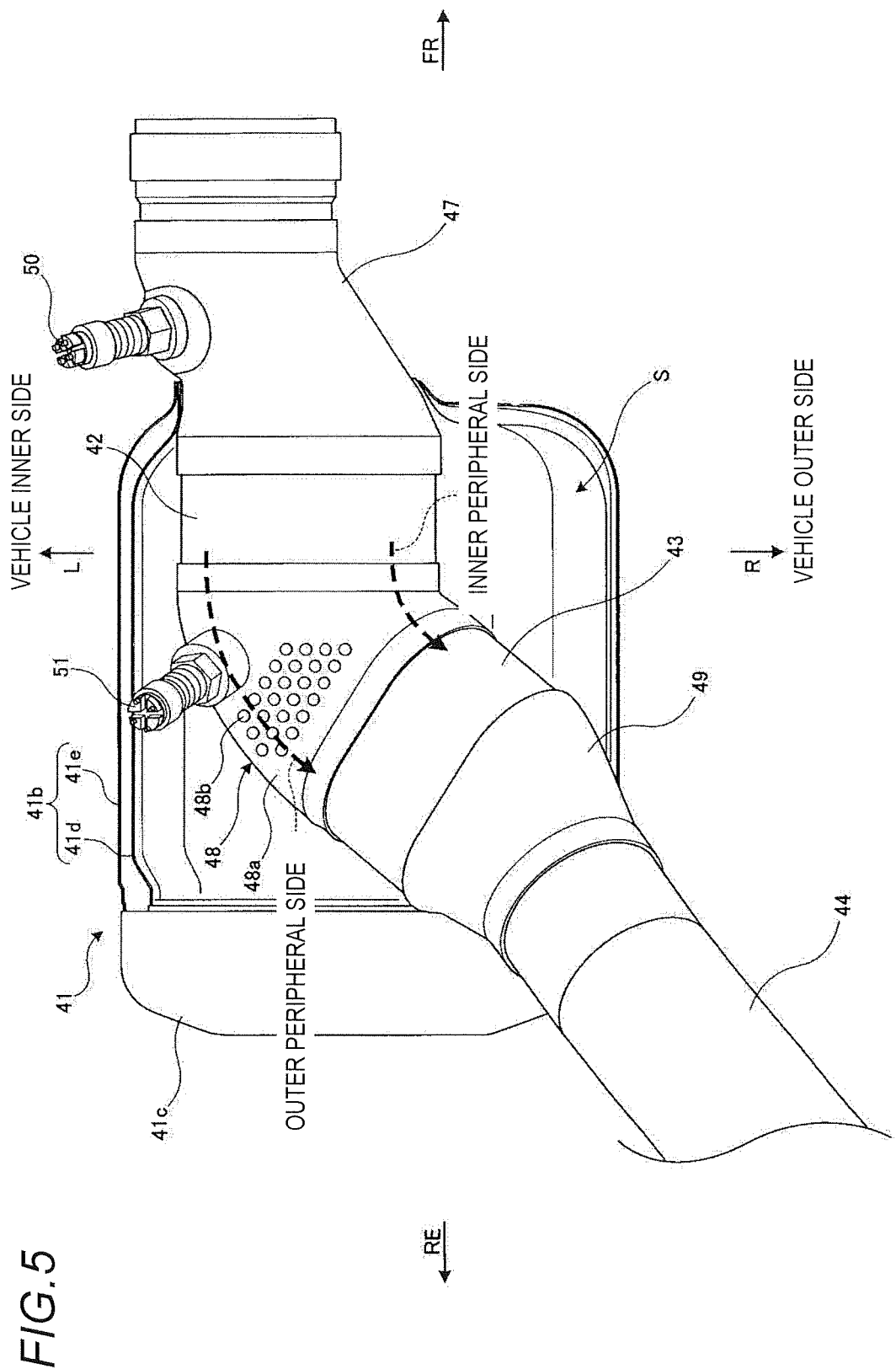
FIG. 5 is a top view showing an internal structure of a chamber according to a modification.

Next, a modification will be described with reference to FIG. 5. FIG. 5 is a top view showing an internal structure of a chamber according to a modification. The modification is different from the embodiment in that a same exhausted gas sensor 51 is arranged in the connection pipe 48 in addition to the exhausted gas sensor 50 provided in the first tapered pipe 47.

As shown in FIG. 5, the upper surface portion 48a of the connection pipe 48 is provided with the exhausted gas sensor 51 that detects the exhausted gas components in the exhaust flow path on a downstream side of the catalyst 42. A basic configuration of the exhausted gas sensor 51 is the same as that of the exhausted gas sensor 50 described above.

A tip end (a detection portion) of the exhausted gas sensor 51 is attached so as to penetrate an inside of the connection pipe 48, and the other end side (a wiring side) of the exhausted gas sensor 51 is slightly inclined rearward toward the vehicle inner side with respect to a direction perpendicular to the axial direction. Accordingly, the oxygen concentration of the exhausted gas after being purified by the catalyst 42 can be detected. By detecting the exhausted gas components before and after the catalyst 42, deterioration diagnosis of the catalyst 42 can be performed. In addition, a deterioration state of the catalyst 43 can be predicted from a state of the catalyst 42.

In particular, the exhausted gas sensor 51 is arranged at an outer side (the outer peripheral side) of the bent portion and on an exhaust upstream side of the connection pipe 48. As described above, since the exhausted gas easily flows faster on the outer peripheral side of the connection pipe 48 than on the inner peripheral side, detection accuracy of the exhausted gas sensor 51 can be improved.

The exhausted gas sensor 51 is arranged at an upstream side of the punching holes 48b. That is, the punching holes 48b are arranged at an exhaust downstream side of the exhausted gas sensor 51. According to this configuration, since the exhausted gas can be applied to the exhausted gas sensor 51 before the exhausted gas is diffused from the punching holes 48b, the detection accuracy of the exhausted gas sensor 51 is not impaired. The shape, size, arrangement number, arrangement interval and the like of the plurality of punching holes 48b can be appropriately changed in accordance with the required output and muffling performance. For example, the output and the muffling performance can be adjusted by gradually reducing or increasing the number, density and size of the punching holes 48b from the inner peripheral side to the outer peripheral side of the connection pipe 48.

Although the parallel four-cylinder engine 3 has been described as an example in the above embodiment, the present disclosure is not limited to this configuration. For example, the engine 3 may be constituted by a single cylinder, two cylinders, three cylinders, or even five or more cylinders, and the arrangement of the cylinders can be appropriately changed.

Although the muffler is arranged at a right side of the vehicle in the above embodiment, the present disclosure is not limited to this configuration. The muffler may be arranged at a left side of the engine 3.

Although the two catalysts 42 and 43 are arranged in the chamber 41 in the above embodiment, the present disclosure is not limited to this configuration. Three or more catalysts may be arranged in the chamber 41.

Although several embodiments and modifications have been described, other embodiments of the present disclosure may be made by combining the above embodiments and modifications totally or partially.

The embodiments of the present disclosure are not limited to the above embodiments, and various changes, substitutions and modifications may be made without departing from the scope of the technical idea of the present invention. If the technical idea of the present disclosure can be realized in another way by technological advancement or another technology derived therefrom, the present disclosure may be implemented using that method. Therefore, the scope of present invention covers all embodiments that may fall within the scope of the technical idea of the present disclosure.

As described above, the present disclosure has the effect of improving the muffling performance and avoiding the output valley, and is particularly useful for the exhaust device of a motorcycle.

What is claimed is:

1. An exhaust device comprising:
   an exhaust pipe connected to an engine for a vehicle;
   a chamber connected to a downstream side of the exhaust pipe;
   at least two catalysts arranged in a vehicle front-rear direction in the chamber; and
   a connection pipe connecting the two catalysts with each other,
   wherein the connection pipe is provided with punching holes,
   wherein one of the catalysts, which is located at a front side in the chamber has an axial center oriented in the vehicle front-rear direction,
   wherein another one of the catalysts, which is located at a rear side in the chamber is arranged obliquely such that a downstream end thereof is oriented to an outside of the vehicle, and
   wherein the connection pipe is bent from the one of the catalysts toward the another one of the catalysts.

2. The exhaust device according to claim 1,
   wherein the one of the catalysts is arranged such that the axial center thereof is arranged at a vehicle inner side with respect to a width center of the chamber, and
   wherein the another one of the catalysts is arranged such that at least a part thereof is arranged at a vehicle outer side with respect to the width center of the chamber.

3. The exhaust device according to claim 1, wherein a downstream end of the one of the catalysts and an upstream end of the another one of the catalysts are arranged adjacent to each other.

4. The exhaust device according to claim 1, wherein each of the catalysts has an elliptical shape cross section orthogonal to an axial direction thereof that is short in a thickness direction of the chamber.

5. The exhaust device according to claim 4,
wherein the connection pipe has an upper surface portion and a lower surface portion corresponding to a long axis of the elliptical shape of the catalysts, and
wherein the punching holes are formed in the upper surface portion and/or the lower surface portion.

6. The exhaust device according to claim 1, wherein the punching holes are arranged in a concentrated manner at a center of the chamber.

7. An exhaust device comprising:
an exhaust pipe connected to an engine for a vehicle;
a chamber connected to a downstream side of the exhaust pipe;
at least two catalysts arranged in a vehicle front-rear direction in the chamber;
a connection pipe connecting the two catalysts with each other; and
an exhausted gas sensor arranged in the connection pipe,
wherein the connection pipe is provided with punching holes, and
wherein the exhausted gas sensor is arranged at an upstream side of the punching holes.

8. The exhaust device according to claim 7, wherein the exhausted gas sensor is arranged at an outer side of a bent portion of the connection pipe.

* * * * *